Figure 1:
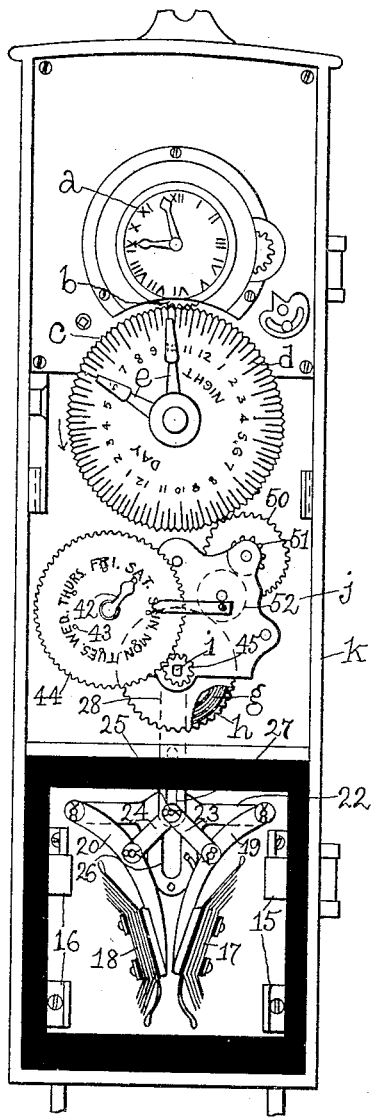

A. P. NELSON.
TIME CIRCUIT CONTROLLING APPARATUS.
APPLICATION FILED OCT. 3, 1908.

965,534.

Patented July 26, 1910.
2 SHEETS—SHEET 1.

Witnesses.
C. H. Garnett
J. Murphy

Inventor:
August P. Nelson
by Jas. H. Churchill
Atty.

A. P. NELSON.
TIME CIRCUIT CONTROLLING APPARATUS.
APPLICATION FILED OCT. 3, 1908.
965,534.
Patented July 26, 1910.
2 SHEETS—SHEET 2.
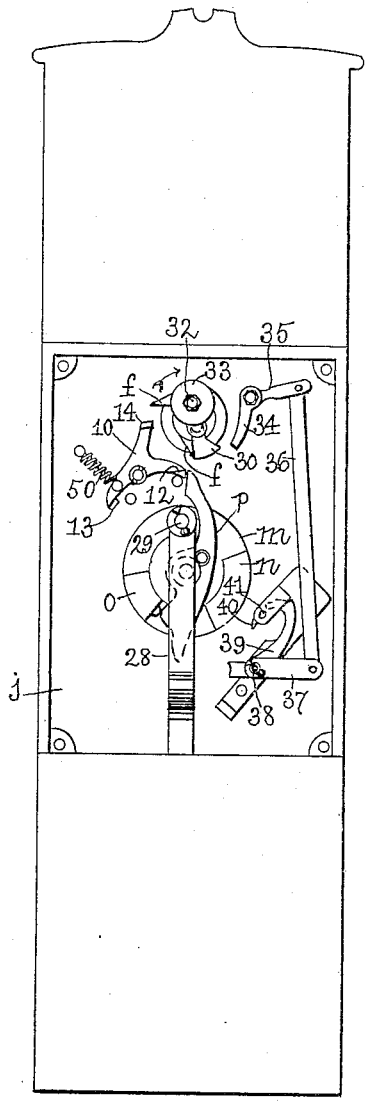
Fig. 2.
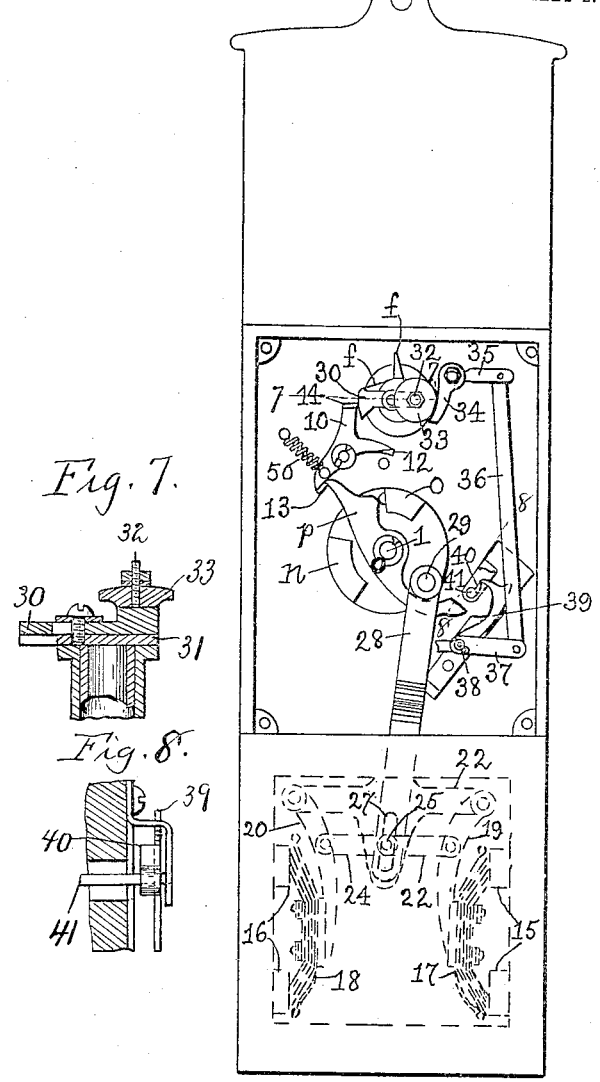
Fig. 3.
Fig. 7.
Fig. 8.
Fig. 4.
Fig. 6.
Fig. 5.
Witnesses.
C. E. Garnett.
J. Murphy
Inventor.
August P. Nelson
by Jas. H. Churchill
Atty.
THE NORRIS PETERS CO., WASHINGTON, D. C.

UNITED STATES PATENT OFFICE.

AUGUST P. NELSON, OF CHICAGO, ILLINOIS, ASSIGNOR TO ALBERT AND J. M. ANDERSON MANUFACTURING COMPANY, OF BOSTON, MASSACHUSETTS, A CORPORATION OF MAINE.

TIME CIRCUIT-CONTROLLING APPARATUS.

965,534. Specification of Letters Patent. Patented July 26, 1910.

Application filed October 3, 1908. Serial No. 456,025.

*To all whom it may concern:*

Be it known that I, AUGUST P. NELSON, a citizen of the United States, residing in Chicago, county of Cook, and State of Illinois, have invented an Improvement in Time Circuit-Controlling Apparatus, of which the following description, in connection with the accompanying drawings, is a specification, like letters on the drawings representing like parts.

This invention relates to a time-switch or circuit controlling apparatus and is herein shown as embodied in a time-switch of the class shown and described in U. S. Patent No. 779,249 dated January 3, 1905.

Switches of the class referred to are constructed to close and open the electric circuits in which they are included at predetermined times, and the present invention has for its object to provide means for prolonging the time for opening the circuit, so that on any selected day, as for instance Saturday, the switch may be maintained closed for a longer time than on other days of the week.

In the present instance, I have shown one embodiment of the invention, in which an auxiliary release or tripping cam or dog is brought into action so as to extend the operation of the motor mechanism which operates the switch or circuit controller.

These and other features of this invention will be pointed out in the claims at the end of this specification.

Figure 1 is a front elevation of a time-switch apparatus embodying this invention, with the cover for the box or case removed. Fig. 2, a rear elevation of the apparatus shown in Fig. 1, with a back plate removed. Fig. 3, a rear elevation showing the position the parts occupy when the switch is maintained closed for the extended period of time. Figs. 4 to 6, details to be referred to. Fig. 7, an enlarged section on the line 7—7, Fig. 3, and Fig. 8, an enlarged section on the line 8—8, Fig. 3.

In the present instance, the invention is shown as embodied in a time-switch of the same general construction as that shown and described in the patent referred to, and which comprises a clock mechanism $a$, which drives a gear $b$ in mesh with the toothed wheel or disk $c$ having radial slots $d$ into which are extended the bent ends or fingers on arms or levers $e$, which position the tripping cams or dogs $f$, so as to release a motor or spring $g$ located in a barrel $h$, mounted on a shaft $i$ extended through the partition wall $j$ of the box or casing $k$. The shaft $i$ has fast on it a disk $m$ provided with bosses $n$, $o$, between which extends one end of a detent bar or lever $p$, loose on the shaft $i$ and coöperating with an escape lever 10 provided with fingers 12, 13, separated from each other and with which the arms or ends of the detent lever or bar $p$ engage successively. The escape lever 10 is provided with a third finger 14 with which coöperate the tripping cams $f$ movable with the arms or levers $e$, so as to release the detent lever and the motor $g$ at predetermined times to close and open the switch, which latter in the present instance differs from the construction shown in the patent referred to and comprises two sets of fixed members 15, 16, and two movable members 17, 18, which are secured to levers 19, 20, pivoted to a metal frame 22 attached to the rear wall of the box $k$. The levers 19, 20, are joined together by toggle levers 23, 24, whose center pin 25 is guided by a slot 26 in the frame 22 and is extended through a slot 27 in the lower end of a connecting rod 28, which is eccentrically connected by the pin 29 with the disk $m$. The apparatus as thus far described operates in substantially the same manner as the apparatus shown in the patent referred to.

As shown in Fig. 1, the arms $e$ are set to engage the slots $d$ numbered six and ten of the disk $c$, so that the motor will operate to close the switch at six o'clock in the evening and to open the same at ten o'clock at night. This arrangement is what may be considered the normal or regular arrangement for service, but in some instances, it is desirable to extend the time for opening beyond the normal time. For instance, on Saturday night, it may be desirable to keep the circuit of electric lamps located in store windows and other places, closed until twelve o'clock, without the necessity of changing the normal condition or arrangement of the apparatus, and the present invention has for its object to provide means for automatically accomplishing this result. In the present instance, I have shown one construction or arrangement, which I may prefer, but I do not desire to limit my invention to the particular construction shown. To this end, the tripping cam $f$, which is connected with the opening hand $e$ of the selective mechanism has coöperating with it an auxiliary tripping cam 30, which is movable with relation to the finger 14 of the escape lever, so that under normal conditions it is inactive on the escape lever, but under other conditions as will be described, becomes active. The auxiliary tripping cam 30 is shown as a bar or piece, which is mounted to slide in a guideway across a disk 31 to which the tripping cam $f$ is attached (see Figs. 4, 5 and 7) and has attached to it a pin 32 upon which is loosely mounted a wheel, disk or roller 33, which coöperates with a cam, herein shown as the curved arm 34 of an elbow lever 35 joined by a link 36 to a crank 37 on a rock-shaft 38 having a second crank or arm 39, which is adapted to be engaged by a dog 40 on a shaft 41 extended through the partition wall $j$ and provided with an arm 42 (see Fig. 1), having its end bent to engage one of a series of holes 43 in a gear 44, which is driven by a pinion 45 on the shaft $i$ to which one end of the spring motor $g$ is secured. The gear 44 is connected with the clock $a$ through the gears $c$, 50, 51, 52 and $h$.

As represented in Fig. 1, the end of the arm 42 is entered into the hole 43 marked Saturday on the gear 44, and the dog 40 is positioned with relation to the crank or arm 39, so that during Saturday, the dog 40 will engage the crank or arm 39 see Figs. 3 and 7 and through the rock-shaft 38, crank 37 and link 36 turn the lever 35 so as to move the cam or arm 34 forward and into position to be engaged by the roller or wheel 33, so that on the continued rotation of the tripping cam $f$, the auxiliary tripping cam 30 will be moved into operative position so as to engage the finger 14 on the escape lever before or at or about the time the tripping cam $f$ is disengaged from said finger (see Fig. 3). The auxiliary cam 30 is made of such width as will keep the escape lever 10 engaged with the detent lever $p$ for the desired length of time beyond that at which it is disengaged from the tripping cam $f$, which for example may be two hours, so that, the circuit will be maintained closed until twelve o'clock, at which time the auxiliary cam 30 will pass out of engagement with the finger 14 and permit the motor to turn the disk $m$ substantially a half turn and open the switch.

As soon as the dog 40 has been moved by the clock out of engagement with the crank or arm 39, the cam 34 is turned back away from the path of the disk or wheel 33, so that on the other nights of the week the auxiliary cam 30 does not prevent the spring 50 from moving the escape lever to release the motor, but on the other hand is itself moved back in its guide-way by the finger 14 on the forward movement of the latter. By turning the arm or pointer 42 so as to register with any other day on the gear 44, the time for prolonging the circuit in its closed condition may be extended on that particular day.

I have herein shown the invention as embodied in one form of automatic time switch, but I do not desire to limit my invention to the particular construction of time-switch or to the particular construction of device for carrying the invention into effect.

I have herein described the invention as applied to the opening of the switch, but it will be evident that the auxiliary tripping cam may coöperate with the tripping cam $f$, which effects the closing of the switch.

Claims.

1. In an apparatus of the character described, in combination, a circuit controller provided with a movable member, a motor mechanism to operate it, a selective mechanism governing the operation of said motor mechanism, a clock mechanism for operating said selective mechanism, and means auxiliary to said selective mechanism and coöperating therewith for retarding the operation of the selective mechanism and for permitting such operation after a predetermined interval of time and while said auxiliary means is in its operative position without disturbing the condition of the selective mechanism for operating said motor mechanism at other predetermined intervals of time, substantially as described.

2. In an apparatus of the character described, in combination, a motor mechanism, a circuit-controller provided with a movable member actuated by said motor mechanism, a clock mechanism, a device controlled by said clock mechanism and governing the operation of said motor mechanism upon said movable member, an auxiliary device for influencing the operation of the said motor mechanism upon said movable member and for permitting such operation after a predetermined interval of time and while said auxiliary device is in its operative position without disturbing the condition of the selective mechanism for operating said motor mechanism at other predetermined intervals of time, and means for rendering said auxiliary device active, substantially as described.

3. In an apparatus of the character described, in combination, a motor mechanism, a circuit controller provided with a movable member actuated by said motor mechanism, a detent lever, an escape lever coöperating with said detent lever, a tripping cam to release said detent lever from said escape lever, an auxiliary tripping cam coöperating with said escape lever to delay the release of the detent lever from said escape lever and for permitting such operation after a predetermined interval of time and while said auxiliary tripping cam is in its operative position without disturbing the condition of the selective mechanism for operating said motor mechanism at other predetermined intervals of time, means for rendering said auxiliary tripping cam active at a predetermined time, and a clock mechanism to operate said cams, substantially as described.

4. In an apparatus of the character described, in combination, a circuit controller provided with a movable member, a time-operated mechanism for operating said movable member, means for selecting the time at which said movable member is operated, and means coöperating with said selecting means for varying the time of the action of the selecting means upon the movable member of the circuit controller and for permitting such action after a predetermined interval of time and while said means is in its operative position without disturbing the condition of the selective mechanism for operating said motor mechanism at other predetermined intervals of time, substantially as described.

5. In an apparatus of the character described, in combination, a circuit controller provided with a movable member, a time mechanism, a tripping cam actuated by said time mechanism and controlling the operation of said movable member, and means actuated by said time mechanism for automatically varying the time of action of said tripping cam to cause the movable member to be operated at a different time than that at which it is normally operated and for permitting such operation after a predetermined interval of time and while said means is in its operative position without disturbing the condition of the selective mechanism for operating said motor mechanism at other predetermined intervals of time, substantially as described.

6. In an apparatus of the character described, a circuit controller provided with a movable member, a clock mechanism, a selective device operated by the clock mechanism and governing the operation of the movable member of said circuit controller, and means for retarding any predetermined operation of the selective device and for permitting such operation after a predetermined interval of time and while said means is in its operative position without disturbing the condition of the selective mechanism for operating said motor mechanism at other predetermined intervals of time, substantially as described.

In testimony whereof, I have signed my name to this specification in the presence of two subscribing witnesses.

AUGUST P. NELSON.

Witnesses:
WM. W. HINCHER,
CHAS. R. WHITMAN.